(12) United States Patent
Dionne

(10) Patent No.: US 9,644,538 B2
(45) Date of Patent: May 9, 2017

(54) PASSIVE COOLING SYSTEM FOR AUXILIARY POWER UNIT INSTALLATION

(75) Inventor: Luc Dionne, Candlac (CA)

(73) Assignee: Pratt & Whitney Canada Corp., Longueuil (CA)

( * ) Notice: Subject to any disclaimer, the term of this patent is extended or adjusted under 35 U.S.C. 154(b) by 754 days.

(21) Appl. No.: 12/048,431

(22) Filed: Mar. 14, 2008

(65) Prior Publication Data
US 2008/0245062 A1    Oct. 9, 2008

Related U.S. Application Data

(63) Continuation of application No. 11/196,508, filed on Aug. 4, 2005, now Pat. No. 7,364,117, which is a
(Continued)

(51) Int. Cl.
*B64D 33/08*    (2006.01)
*F02C 7/14*    (2006.01)
(Continued)

(52) U.S. Cl.
CPC ............... *F02C 7/14* (2013.01); *B64D 33/08* (2013.01); *B64D 33/10* (2013.01); *B64D 41/00* (2013.01); *B64D 2033/0213* (2013.01); *B64D 2041/002* (2013.01); *F05D 2220/50* (2013.01); *F05D 2260/20* (2013.01); *Y02T 50/675* (2013.01)

(58) Field of Classification Search
CPC .... F02C 7/14; F05D 2260/20; F05D 2220/50; B64D 2033/0213; B64D 2041/002; B64D 33/08; B64D 33/10; B64D 41/00; Y02T 50/675

USPC ..... 244/57, 58, 53 R, 53 B; 60/226.1, 39.08, 60/39.33
See application file for complete search history.

(56) References Cited

U.S. PATENT DOCUMENTS 2,352,790 A    7/1944   Jordan
2,479,573 A    8/1949   Howard
(Continued)

FOREIGN PATENT DOCUMENTS

EP    0 807 576    11/1997
GB    723406      2/1955
(Continued)

*Primary Examiner* — Valentina Xavier
(74) *Attorney, Agent, or Firm* — Bachman & LaPointe, P.C.

(57) ABSTRACT

A passive cooling system for an auxiliary power unit (APU) installation on an aircraft is provided. The system is for an auxiliary power unit having at least a compressor portion of a gas turbine engine and an oil cooler contained separately within a nacelle. The system includes the auxiliary power unit housed within the nacelle of the aircraft, an engine exhaust opening defined in the aft portion of the nacelle and communicating with the gas turbine engine, at least a first air inlet duct communicating with a second opening defined in said nacelle and with said compressor portion and the oil cooler is located within a second duct communicating with an opening other than the engine exhaust opening of said nacelle and with the engine exhaust opening. Exterior cooling air and engine exhaust ejected through said engine exhaust opening entrain cooling air through said second duct to said oil cooler, and thus provide engine oil cooling. An exhaust eductor is also provided.

23 Claims, 7 Drawing Sheets

Related U.S. Application Data continuation of application No. 10/608,224, filed on Jun. 30, 2003, now Pat. No. 6,942,181, which is a continuation of application No. 10/020,363, filed on Oct. 29, 2001, now Pat. No. 6,651,929.

(51) Int. Cl.
  *B64D 33/10* (2006.01)
  *B64D 41/00* (2006.01)
  *B64D 33/02* (2006.01)

(56) References Cited

U.S. PATENT DOCUMENTS

| | | |
|---|---|---|
| 2,548,794 A | 4/1951 | Hotz et al. |
| 2,575,683 A | 11/1951 | Price |
| 2,613,501 A | 10/1952 | Price |
| 2,625,009 A | 1/1953 | Leggett et al. |
| 2,652,216 A | 9/1953 | Hoffman |
| 2,653,585 A | 9/1953 | Wallace |
| 2,672,013 A | 3/1954 | Lundquist |
| 2,696,712 A | 12/1954 | Lewis |
| 2,706,255 A | 4/1955 | Breaux et al. |
| RE24,179 E | 7/1956 | Breaux et al. |
| 2,853,854 A | 9/1958 | Avery et al. |
| 2,865,580 A | 12/1958 | Marshall |
| 2,949,734 A | 8/1960 | Bertin et al. |
| 2,958,188 A | 11/1960 | Leitner et al. |
| 3,058,302 A | 10/1962 | Kuzyk |
| 3,080,716 A | 3/1963 | Cummings et al. |
| 3,196,608 A | 7/1965 | Tindale |
| 3,641,766 A | 2/1972 | Uehling |
| 3,696,617 A | 10/1972 | Ellis |
| 3,710,890 A | 1/1973 | True et al. |
| 3,791,682 A | 2/1974 | Mitchell |
| 3,812,672 A | 5/1974 | Escher |
| 3,841,091 A | 10/1974 | Sargisson et al. |
| 3,881,315 A | 5/1975 | Hess et al. |
| 3,952,972 A | 4/1976 | Tedstone et al. |
| 4,044,555 A | 8/1977 | McLoughlin et al. |
| 4,052,847 A | 10/1977 | Rodgers et al. |
| 4,128,769 A | 12/1978 | Bons et al. |
| 4,135,363 A | 1/1979 | Packman |
| 4,142,365 A | 3/1979 | Sargisson et al. |
| 4,203,566 A | 5/1980 | Lord |
| 4,250,703 A | 2/1981 | Norris et al. |
| 4,271,666 A | 6/1981 | Hurley et al. |
| 4,290,262 A | 9/1981 | Wynosky et al. |
| 4,351,150 A | 9/1982 | Schulze |
| 4,418,879 A | 12/1983 | Vanderleest |
| 4,474,001 A | 10/1984 | Griffin et al. |
| 4,487,017 A | 12/1984 | Rodgers |
| 4,493,184 A | 1/1985 | Nikkanen et al. |
| 4,501,393 A | 2/1985 | Klees et al. |
| 4,546,605 A | 10/1985 | Mortimer et al. |
| 4,555,902 A | 12/1985 | Pilarczyk |
| 4,566,270 A | 1/1986 | Ballard et al. |
| 4,773,212 A | 9/1988 | Griffin et al. |
| 4,782,658 A | 11/1988 | Perry |
| 4,815,281 A | 3/1989 | Gely |
| 4,825,644 A | 5/1989 | Bubello et al. |
| 4,830,312 A | 5/1989 | Hain et al. |
| 4,887,424 A | 12/1989 | Geidel et al. |
| 4,892,269 A | 1/1990 | Greco et al. |
| 4,909,346 A | 3/1990 | Torkelson |
| 4,930,725 A | 6/1990 | Thompson et al. |
| 4,934,154 A | 6/1990 | Altoz et al. |
| 4,999,994 A | 3/1991 | Rud et al. |
| 5,054,281 A | 10/1991 | Mutch |
| 5,265,408 A * | 11/1993 | Sheoran et al. ............... 60/782 |
| 5,284,012 A | 2/1994 | Laborie et al. |
| 5,351,476 A | 10/1994 | Laborie et al. |
| 5,438,823 A | 8/1995 | Loxley et al. |
| 5,450,719 A | 9/1995 | Marsh |
| 5,555,722 A | 9/1996 | Mehr-Ayin et al. |
| 5,655,359 A | 8/1997 | Campbell et al. |
| 5,908,159 A | 6/1999 | Rudolph |
| 5,987,877 A | 11/1999 | Steiner |
| 6,000,210 A | 12/1999 | Negulescu |
| 6,092,360 A | 7/2000 | Hoag et al. |
| 6,247,668 B1 | 6/2001 | Reysa et al. |
| 6,264,137 B1 | 7/2001 | Sheoran |
| 6,282,881 B1 | 9/2001 | Beutin et al. |
| 6,615,576 B2 | 9/2003 | Sheoran et al. |
| 6,651,929 B2 | 11/2003 | Dionne |
| 6,942,181 B2 | 9/2005 | Dionne |
| 7,152,410 B2 | 12/2006 | Sheoran et al. |
| 7,364,117 B2 * | 4/2008 | Dionne .................... 244/58 |
| 2002/0139120 A1 | 10/2002 | Sheoran et al. |

FOREIGN PATENT DOCUMENTS

| | | |
|---|---|---|
| GB | 2044359 | 10/1980 |
| GB | 2164706 | 3/1986 |
| GB | 2204642 | 11/1988 |

* cited by examiner

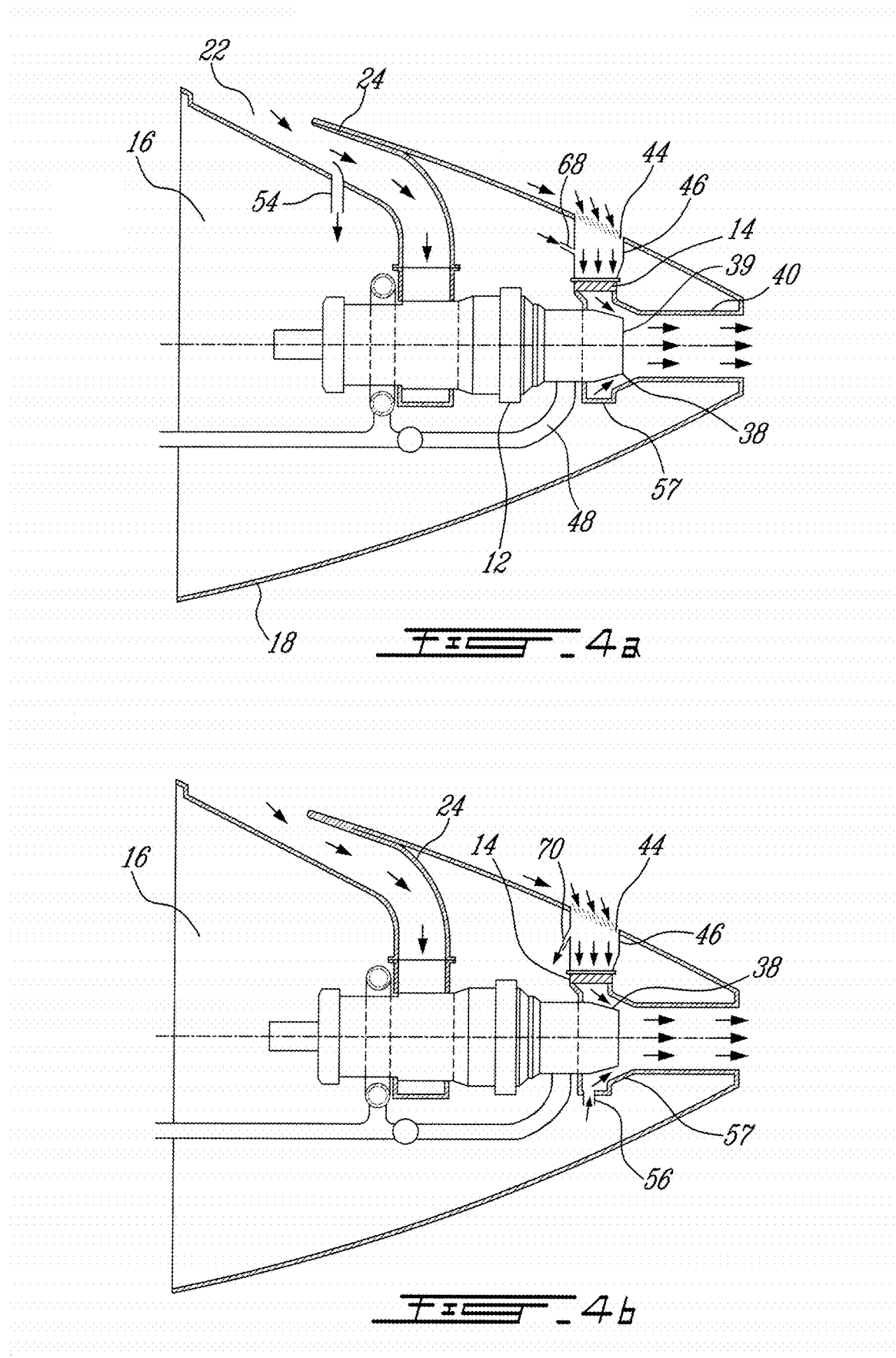

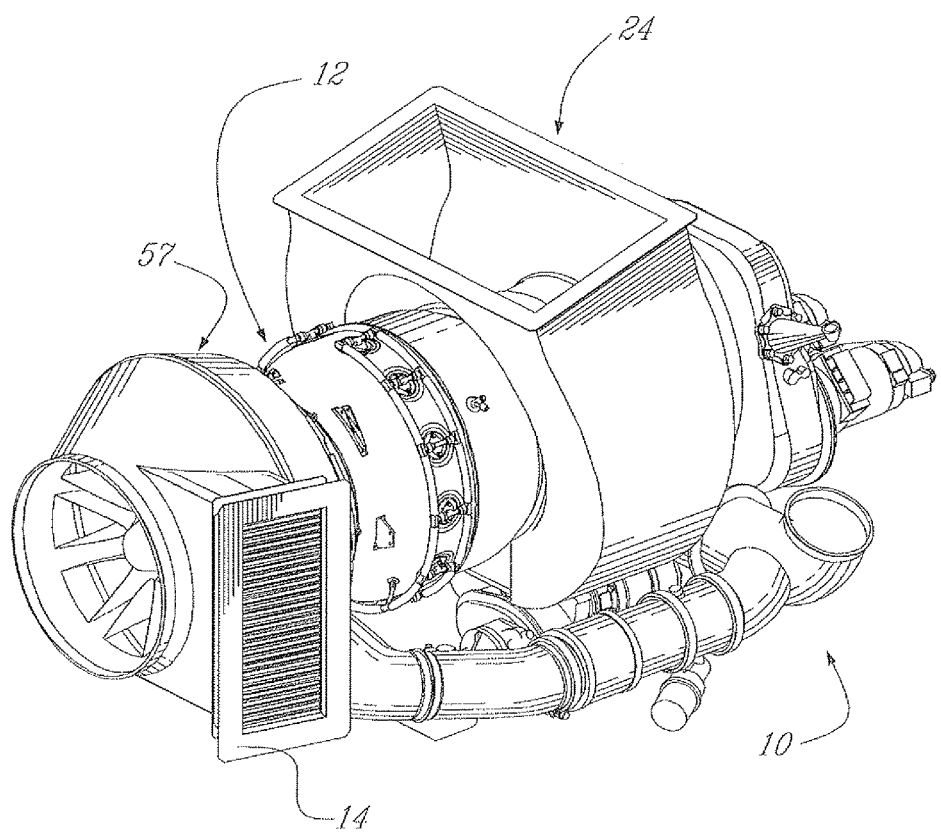

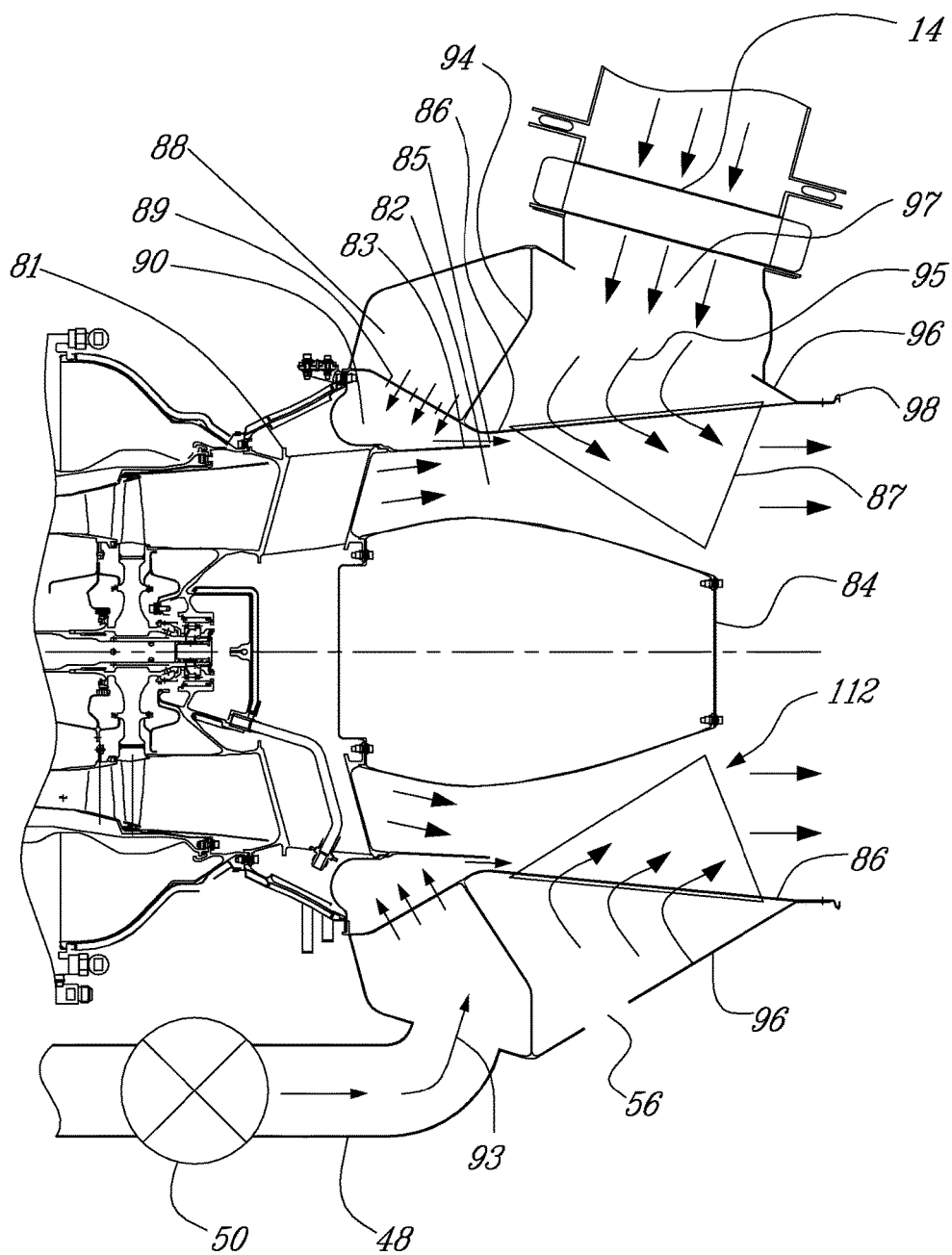

PASSIVE COOLING SYSTEM FOR AUXILIARY POWER UNIT INSTALLATION

CROSS-REFERENCE TO RELATED APPLICATIONS

This application is a continuation of U.S. patent application Ser. No. 11/196,508, filed on Aug. 4, 2005, now U.S. Pat. No. 7,364,117 which is a continuation of U.S. patent application Ser. No. 10/608,224, filed on Jun. 30, 2003, now U.S. Pat. No. 6,942,181, which is a continuation of U.S. patent application Ser. No. 10/020,363 filed Oct. 29, 2001, now issued as U.S. Pat. No. 6,651,929, the entire contents of each of which are incorporated herein by reference.

TECHNICAL FIELD

The present invention relates to cooling systems for auxiliary power units on airplanes and, more particularly, pertains to the passive cooling of the components and oil of such units and the enclosure ventilation of such units.

BACKGROUND OF THE INVENTION

Large aircraft often use an on-board auxiliary power unit (APU) to provide electrical power and compressed air for systems throughout the airplane. When the aircraft is grounded, the APU provides the main source of power for environmental control systems, hydraulic pumps, electrical systems and main engine starters. During flight, the APU can supply pneumatic and electric power.

Auxiliary power units are generally small gas turbine engines, often mounted in the aft tail section of the aircraft. They require a certain amount of cooling air, and are lubricated by oil that is generally cooled by an oil cooler which also requires cooling air. Active cooling systems are usually employed to provide this cooling air, and are typically comprised of an active fan used to push air through the oil cooler and across auxiliary power unit components. These fans are driven at high speeds by the APU through a complex shaft and gear assembly. The mechanical complexity and high operating speeds of these fans increases the possibility of failure. Active fan cooling systems therefore can significantly reduce the reliability of an auxiliary power unit.

While APU passive cooling systems which eliminate the need for active fan cooling systems are well known, they all generally draw cooling air into the APU compartment, before it is drawn through the air cooled oil cooler. This arrangement causes the cooling air to be heated up in the compartment before it reaches the oil cooler, and therefore, oil cooling is not optimized. U.S. Pat. No. 5,265,408, for example, discloses a method and apparatus for cooling a compartment mounted gas turbine engine comprising a first exhaust eductor within which is mounted an oil cooler, and which incorporates a mixer nozzle to entrain cooling air flow first through the APU compartment and then through the oil cooler. Surge bleed flow from the load compressor is discharged into the exhaust eductor. Ambient air is received into the compartment through a second exterior eductor inlet.

U.S. Pat. No. 5,655,359 similarly discloses an APU passive cooling system wherein cooling air for the oil cooler is drawn from the compartment. An inlet scoop in the engine air intake duct used to divert a portion of the air flow into the APU compartment. This air is used to cool the engine before being drawn through the oil cooler, mounted in a vacuum duct, by a lobed mixer which acts as an aspirator.

U.S. Pat. No. 6,092,360 discloses an APU passive cooling system in which cooling air is drawn into the engine compartment through an opening located in the rear of the aircraft. An eductor mounted before the exhaust duct of the engine, draws compartment air through the oil cooler, which in turn draws atmospheric air in through the aft opening.

Thus, while these patents provide for cooling of an auxiliary power unit without the use of a mechanically driven fan, they all teach systems which draw cooling air for the oil cooler from the APU compartment. A need exists for an auxiliary power unit passive cooling system that can provide enhanced oil cooling capabilities by directing exterior cooling air, through ducts, directly to the oil cooler, and which is nevertheless adaptable enough to be able to provide damage protection from foreign objects and be combined with the engine compressor surge bleed flow to provide improved airflow through the oil cooling heat exchanger.

SUMMARY OF THE INVENTION

It is an object of the present invention to provide an improved cooling system for an auxiliary power unit on an airplane.

It is also an object of the present invention to provide a simpler cooling system for auxiliary power unit engine oil and external components which does not require moving parts and does not include a cooling fan.

It is a further object of the present invention to provide improved cooling of the oil in an auxiliary power unit by providing enhanced cooling airflow through the heat exchanger.

Therefore, in accordance with the present invention there is provided a passive cooling system for an auxiliary power unit installation on an aircraft, comprising an auxiliary power unit housed within a nacelle of the aircraft, the auxiliary power unit comprising at least a compressor portion of a gas turbine engine and an oil cooler contained separately within the nacelle, an engine exhaust opening defined in the aft portion of the nacelle and communicating with the gas turbine engine, at least a first cooling air inlet duct communicating with a second opening defined in the nacelle and with the compressor portion, the oil cooler located within a second duct communicating with the exterior of the nacelle and the engine exhaust opening whereby exterior cooling air, and engine exhaust ejected through the engine exhaust opening entrains cooling air through the second duct to the oil cooler, providing engine oil cooling.

In accordance with the present invention, there is also provided a passive cooling system for an auxiliary power unit installation on an aircraft, comprising: an auxiliary power unit housed within a nacelle of the aircraft, the auxiliary power unit comprising at least a compressor portion of a gas turbine engine and an oil cooler contained separately within said nacelle; an engine exhaust opening defined in the aft portion of said nacelle and communicating with said gas turbine engine via an exhaust eductor assembly; said exhaust eductor assembly being in fluid flow communication with a compressor surge bleed duct; at least a first air inlet duct communicating with a second opening defined in said nacelle and with said compressor portion; and said oil cooler located within a second duct communicating with an opening other than the engine exhaust opening of said nacelle and with said engine exhaust opening, whereby exterior cooling air and engine exhaust ejected through said exhaust eductor assembly, entrain cooling air through said second duct to said oil cooler, providing engine oil cooling.

In accordance with a more specific embodiment of the present invention, the engine air inlet includes a first duct portion, and the second duct is bifurcated from the first duct portion and extends downstream from the first duct portion with a third duct portion also formed downstream of the first duct, the third duct portion communicating with the compressor portion and the oil cooler located within the second duct portion providing direct exterior cooling air to the oil cooler.

In one embodiment, contamination of aircraft environmental control system air is prevented by an air inlet splitter, which isolates the load compressor gas path. Protection against damage from foreign objects, for the powerplant, may be provided by a bypass duct located in-line with the first air inlet duct, and a scavenger discharge duct and outlet which expels harmful foreign objects from the aircraft. The nacelle is provided with a rear exhaust opening, and at least a second opening for the outside air intake. The third air inlet duct portion directs the air from the air intake to the engine compressor portion. The auxiliary power unit comprises a gas turbine engine having both load and core compressors and a compressor surge bleed valve and duct. The oil cooler may comprise an air-to-oil heat exchanger. The engine exhaust ejector creates a depressurization in the nacelle or in the exhaust eductor assembly, which results in the entrainment of cooling air through the heat exchanger and through the nacelle. In at least one embodiment, a dedicated small opening in the exhaust eductor assembly permits nacelle ventilation.

Further features and advantages of the present invention will become fully apparent by referring to the following detailed description, claims, and the appended drawings.

BRIEF DESCRIPTION OF THE DRAWINGS

FIG. 2b is a cross sectional schematic illustration of the second embodiment of the APU passive cooling system shown in FIG. 2a.

FIGS. 4a to 4d are cross sectional schematic illustrations of a fourth embodiment of the APU passive cooling system in accordance with the present invention.

FIG. 5 is a perspective view of an engine having a main air inlet duct and exhaust eductor assembly in accordance with the present invention.

FIG. 6 is a vertical cross-sectional view of an exhaust eductor assembly used in accordance with the present invention.

DETAILED DESCRIPTION OF THE PREFERRED EMBODIMENT

Figure 1:
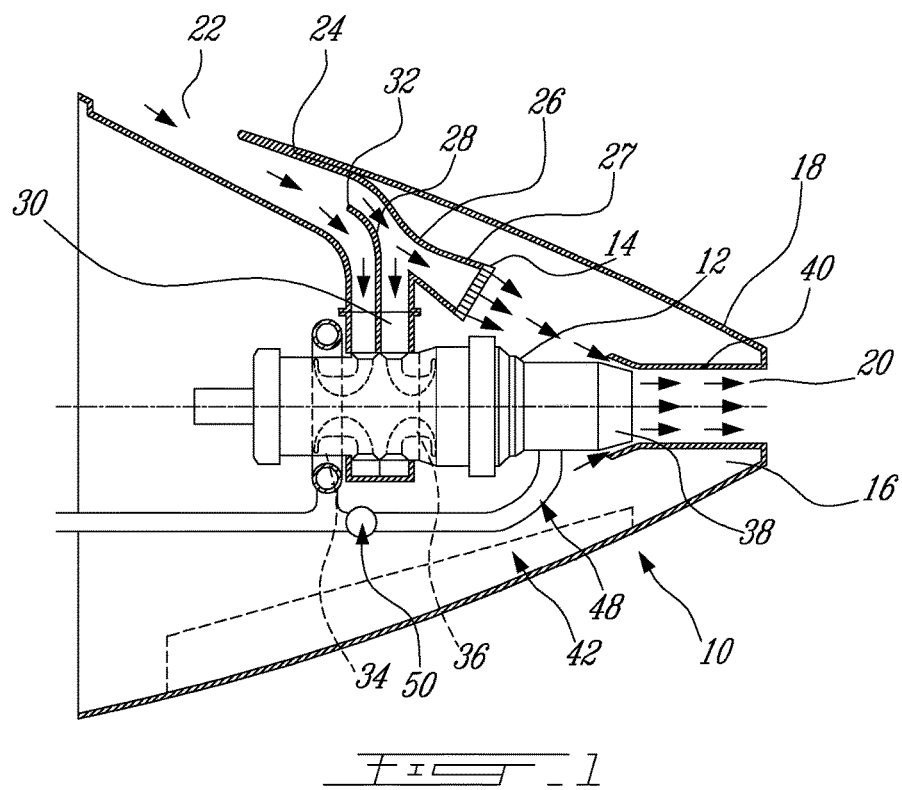
FIG. 1 is a cross sectional schematic illustration of a first embodiment of the APU passive cooling system in accordance with the present invention.

Referring to the drawings, FIG. 1 embodies an APU installation 10 comprising the elements of the present invention that will be described. The APU installation 10 is principally comprised of a gas turbine power plant 12 and an oil cooler 14, both within an auxiliary power unit nacelle 16. This nacelle is defined for the purposes of the present invention, as any dedicated enclosed compartment or enclosure, generally although not essentially located within the aircraft tailcone. The nacelle 16 shown in these embodiments as an aft compartment in the aircraft, has an exterior skin surface 18. Compartment access doors 42 allow external access to the auxiliary power unit when the aircraft is on the ground, for such purposes as engine maintenance.

In the embodiment shown in FIG. 1, the exterior surface 18 of the APU nacelle 16 comprises principally two openings, the rear exhaust opening 20 and the main air inlet opening 22. The main air inlet opening 22 in the aircraft exterior skin 18 allows air to be drawn from outside the aircraft by the power plant compressors. The gas turbine engine power plant 12 is comprised of two compressors, a load compressor 34 and a core compressor 36. The load compressor 34 provides the aircraft environmental control system (ECS) air, while the core compressor 36 provides the powerplant with air for combustion. Inlet air is directed by a first air inlet duct 24 from the air inlet opening 22 to the power plant compressors. The oil cooler 14, shown to be normal to the direction of airflow but is not necessarily limited to this orientation, is located in a second duct 27. A bifurcation 26 in the first air inlet duct 24 is provided to directly supply cooling air to the oil cooler 14, in the form of an air-to-oil heat exchanger, through the second duct 27. This allows air to be directly fed to the oil cooler 14 through a duct, providing improved cooling airflow. After passing through the oil cooler, the cooling air enters the APU compartment 16 to provide cooling to the APU components.

An exhaust ejector 38 of the powerplant 12, causes a depressurization of the APU compartment 16. The exhaust ejector 38 achieves this by reducing the diameter of the power plant exhaust passage, causing an increase in the velocity of the exhaust gases. This causes the depressurization upstream in the APU compartment 16, resulting in entrainment of the cooling air through the heat exchanger and the APU compartment, thereby cooling the engine oil and the powerplant components within the APU compartment.

Within the first air inlet duct 24 is located an air inlet splitter 28. The splitter 28 in the engine air inlet duct 24 extends down into the engine intake plenum 30. The air splitter 28 and the bifurcation 26 in the first air inlet duct are positioned such that the bifurcation 26 in the inlet duct is downstream of the leading edge 32 of the splitter 28. When the power plant is run with the access doors 42 open, the resulting ambient pressure in the APU compartment 16 equalizes with the outside air pressure, which causes a flow reversal within the heat exchanger as the power plant creates a depression within the first air inlet duct 24. In this operating mode, a reversal of airflow occurs, as the air is entrained from the compartment, through the heat exchanger and the second duct 27, and gets ingested into the engine. The splitter 28, consequently, prevents contamination of the airflow of the load compressor 34 in the event of a leak in the heat exchanger 14 when the powerplant is operated with the compartment access doors 42 open. Therefore, any oil leaked from the heat exchanger is forced down the core compressor and burned by the engine, rather than contaminating the aircraft environmental control system air.

Figure 2A:
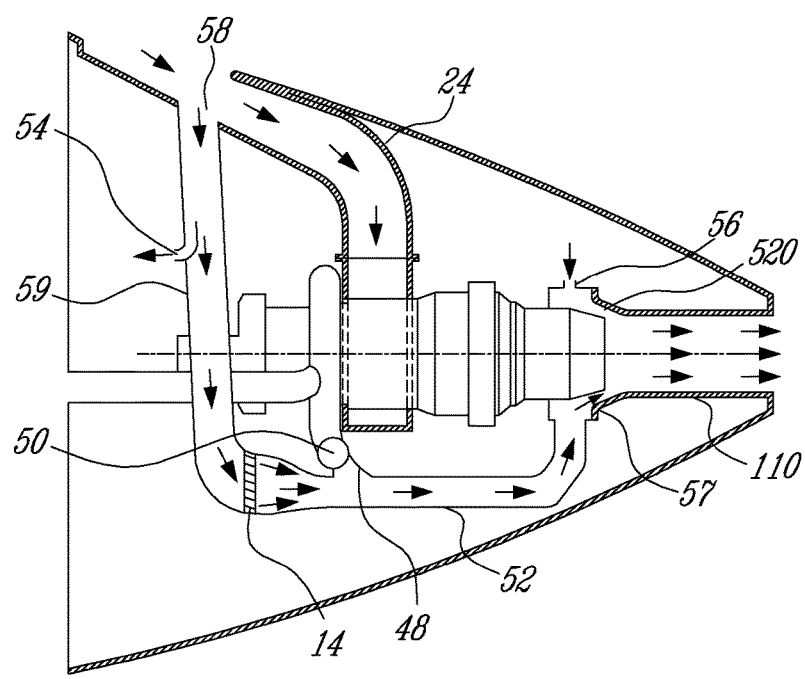
FIG. 2a is a cross sectional schematic illustration of a second embodiment of the APU passive cooling system in accordance with the present invention.
Figure 2B:
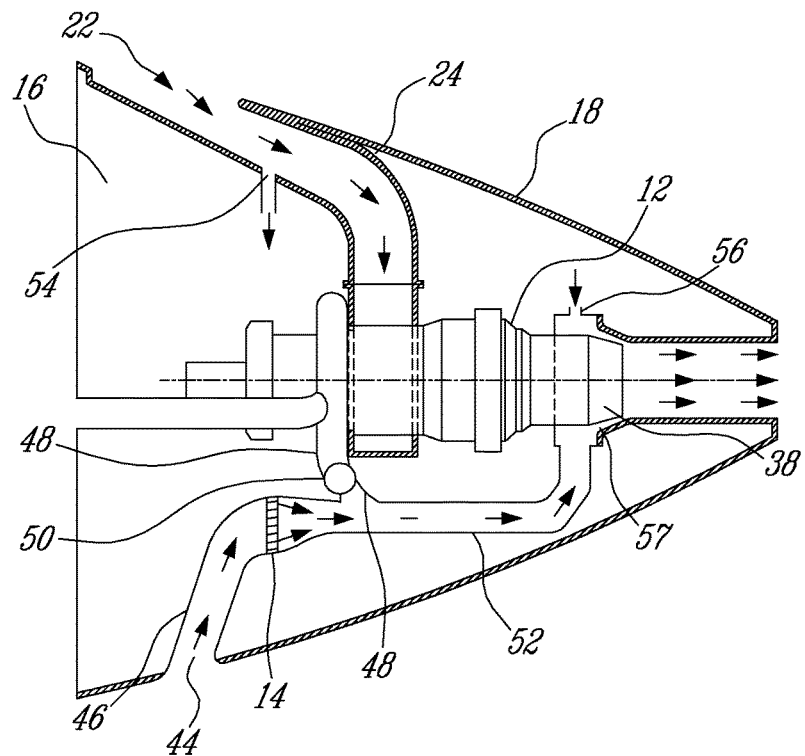

FIGS. 2a and 2b illustrate an alternate embodiment of the passive cooling system. Referring to the embodiment illustrated in FIG. 2a, a heat exchanger air inlet duct 59 directs cooling air from a bifurcation 58 in the main engine air inlet duct 24 to the heat exchanger 14, and a heat exchanger discharge duct 52 directs cooling air downstream of the heat exchanger 14 directly to an exhaust eductor assembly 57. The exhaust eductor, or exhaust ejector plenum, while it is generally an annular plenum adapted to receive exiting APU cooling air which is drawn through the eductor and into the engine exhaust by the depressurization caused by the engine exhaust ejector 38, could alternately be any similar device of varying shape which performs the equivalent function. APU component cooling air is admitted into the APU compartment through a small second bifurcation 54 in the heat exchanger air inlet duct 59. The component cooling air then exits the APU compartment 16 through another small bifurcation 56 in the exhaust eductor assembly 57. The surge bleed duct 48 is combined with the heat exchanger discharge duct 52 downstream of both the surge bleed valve 50 and the heat exchanger 14. The mixing plane for the mixing of heat exchange airflow and exhaust flow is shown as 520. This combined heat exchanger and surge bleed duct design, while preventing contaminating oil from the heat exchanger 14 from entering the aircraft bleed system or the ECS air, provides further enhanced airflow through the heat exchanger when the surge bleed valve 50 is open.

In the embodiments shown in FIGS. 2a and 2b, the oil cooler is located further forward with respect to the engine, nearer the gearbox casing of the power plant and close to the oil pumps of the engine. This eliminates the need for long oil lines. The surge bleed valve 50 is closed when the APU supplies bleed air to the aircraft. However, when the APU only supplies electric power, the surge bleed valve 50 is opened, and the junction between the surge bleed duct 48 and the heat exchanger discharge duct 52 is designed to enhance air flow through the heat exchanger using the additional kinetic energy of the surge bleed flow, thereby improving oil cooling. As in the embodiment of FIG. 1, the exhaust ejector 38, here within the exhaust eductor assembly 57, causes the entrainment of cooling air flow through the heat exchanger and out through the engine exhaust duct 110.

FIG. 2b illustrates a similar embodiment as FIG. 2a, having, however, a dedicated heat exchanger opening 44 in the exterior surface 18 of the nacelle compartment 16. This provides outside air via the alternate heat exchanger inlet duct 46 to the heat exchanger 14. In this embodiment, the compartment cooling air inlet 54 is shown to be located in the first air inlet duct 24 rather than the heat exchanger inlet duct 59. Nevertheless, either location for the compartment air inlet 54 is possible. The embodiment shown in FIG. 2b, however, provides independent air cooling sources for the oil cooler and the engine components within the APU compartment. The advantage of this embodiment over that shown in FIG. 1 is that more efficient cooling of the engine components is achieved because cooling air does not first get warmed by first going through the heat exchanger before it reaches the APU components.

Figure 3:
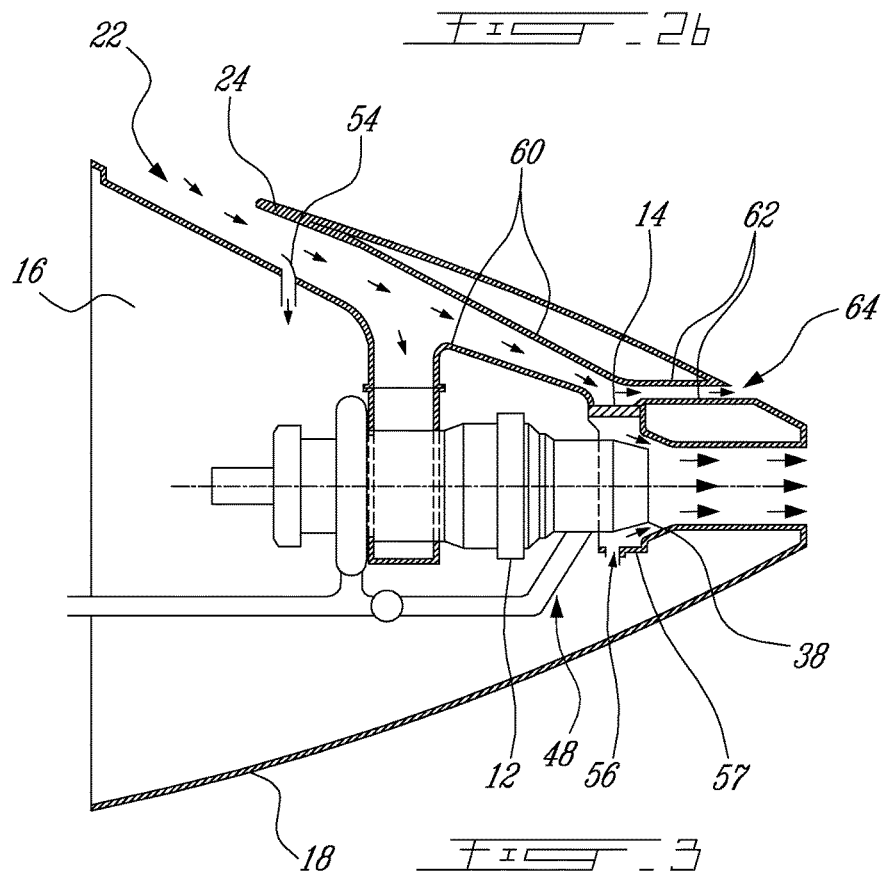
FIG. 3 is a cross sectional schematic illustration of a third embodiment of the APU passive cooling system in accordance with the present invention.

FIG. 3 shows a further embodiment of the present invention. This embodiment additionally includes a duct providing foreign object damage protection for the engine. The power plant compressors draw air from the outside through a main air inlet opening 22 in the aircraft skin exterior surface 18. The engine air inlet duct 24 directs the air to the engine compressors. According to the embodiment shown in FIG. 2b, a small bifurcation 54 in the inlet duct is provided to supply cooling air to the APU compartment. The exhaust ejector 38 within the exhaust eductor assembly 57 creates a depressurization of the APU compartment resulting in airflow through the bifurcation opening 54 in the air inlet duct. Cooling air exits the APU compartment through a second bifurcation 56 in the exhaust eductor assembly 57.

An in-line bypass duct 60 is adjoined to the first air inlet duct 24, in order to direct cooling air to the heat exchanger 14, located in the mouth of the eductor assembly 57 parallel to the direction of airflow in the bypass duct. The airflow in the bypass duct 60 is sustained by the eductor induced flow through the oil cooling heat exchanger. One advantage this embodiment permits is the use of a smaller oil cooler. A scavenge discharge duct 62 is used as a collector to discharge overboard any foreign objects collected by the bypass duct 60. The bypass and scavenge ducts are designed such that separated liquid and solid particles will drain or be drawn by gravity out through the scavenge duct exit 64. The scavenge duct 62 and scavenge exit 64 are sized such that flow reversal is minimized during aircraft static and low speed conditions which cause flow reversal in the scavenge duct. The air bypass and the scavenge ducts 60 and 64 respectively, provide a level of foreign object damage protection for the powerplant.

Figure 4C:
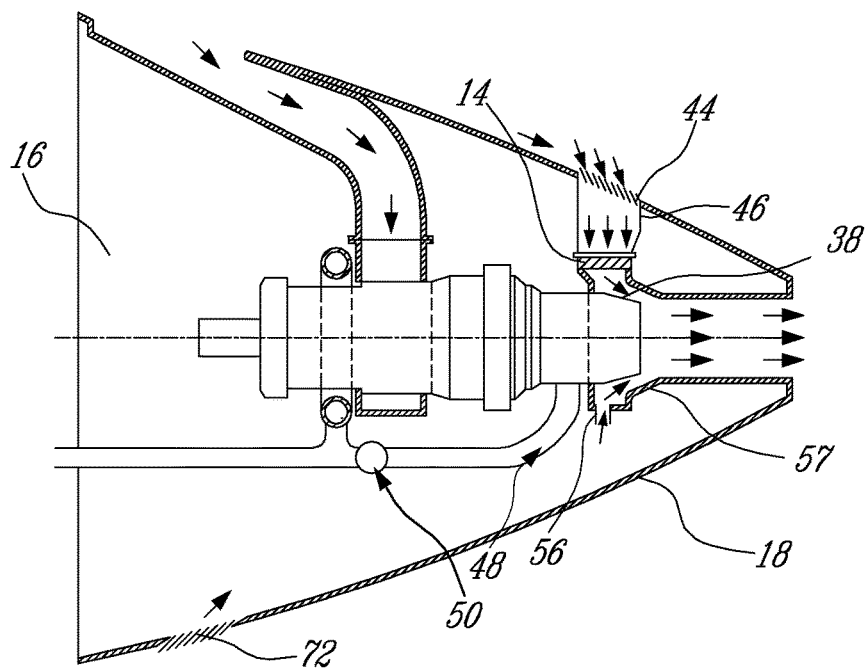

FIGS. 4a to 4d show another embodiment of the present invention wherein the oil cooler 14 is located within the exhaust eductor assembly 57 and the dedicated heat exchanger inlet duct 46 feeds air directly from the aircraft exterior to the oil cooler. Dedicated heat exchanger opening 44 in the exterior surface 18 of the aircraft's nacelle compartment 16 permits exterior air to be fed through the inlet duct 46 to the oil cooler 14 located perpendicular to the inlet air flow in the annular exhaust eductor assembly 57. The engine exhaust ejector 38 within the eductor assembly 57 draws the cooling air through the heat exchanger inlet duct 46 and the oil cooler 14, and out into the main engine exhaust duct 40. As can be seen in FIG. 4a, the surge bleed air flowing through duct 48 is injected into one of the heat exchange air flow and the gas turbine exhaust flow upstream of the plane 39 where these two flows mixed together.

Figure 4D:
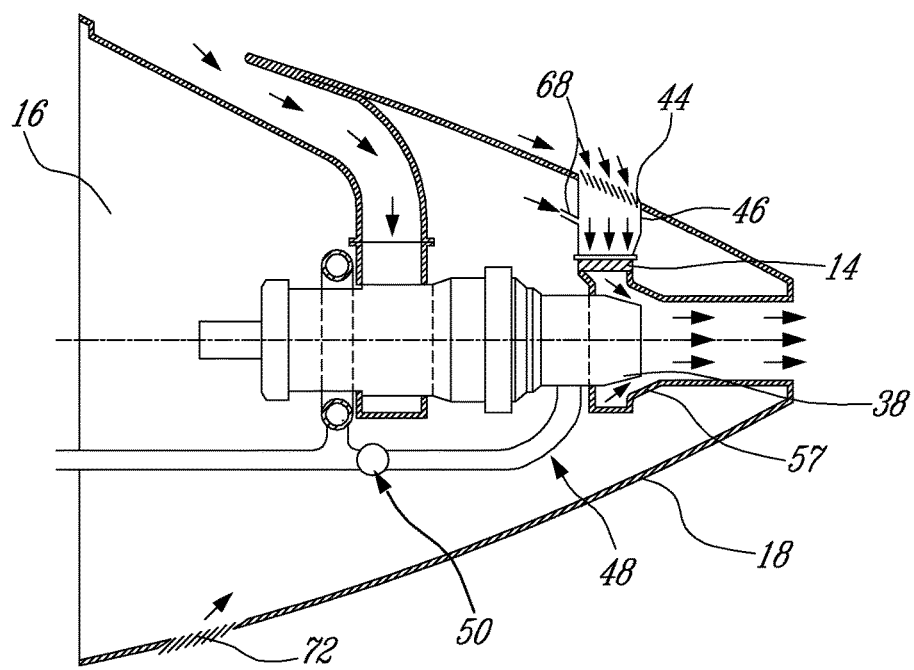

The variations of the fourth embodiment of the present invention shown in FIGS. 4a to 4d, involve alternate locations of the compartment cooling air inlet and exits. FIG. 4a shows an embodiment wherein the compartment cooling air inlet 54 is a bifurcation in the main engine air inlet duct 24. This permits air to enter the nacelle compartment 16 to provide cooling to the externals of the APU. This cooling air then exits the compartment through a bifurcation in the heat exchanger inlet duct 46 for the compartment cooling air exit 68. The embodiment shown in FIG. 4b uses a compartment cooling air inlet 70 in the heat exchanger inlet duct 46. The compartment cooling air then exits the nacelle compartment through a small bifurcation 56 in the exhaust eductor assembly 57, similar to the embodiments of FIGS. 2 and 3. The embodiments of FIGS. 4c and 4d both have a separate compartment cooling air inlet 72 in the exterior surface 18 of the nacelle compartment 16. The engine exhaust ejector 38 pulls cooling air from the exterior of the aircraft via the air inlet 72, through the compartment 16, and out through either the air exit bifurcation 56 in the exhaust eductor 57, as shown in FIG. 4c, or the air exit bifurcation 68 in the heat exchanger inlet duct 46, as shown in FIG. 4d.

FIG. 5 shows an embodiment of the APU installation 10, comprising the gas turbine power plant 12, the oil cooler 14 and the exhaust eductor assembly 57.

The assembly shown in FIG. 6 consists of a construction of sheet metal components either welded or riveted together. The assembly is of modular design and is supported by the engine exhaust casing 81. The exhaust eductor assembly comprises a primary nozzle 82 located immediately downstream of the engine exhaust gas path. The gas path of the primary nozzle 82 is bounded by the primary nozzle shroud 83 and exhaust plug 84. The primary nozzle is circumscribed by the surge bleed nozzle 85, which is bounded by the cooling air plenum inner shroud 86 and the primary nozzle shroud 83. The conical cooling air mixing plane is located downstream of the primary nozzle 82.

Mixing lobes 87 are introduced in a lobed mixer 112 to improve the mixing efficiency, thereby resulting in improved cooling mass flow. The number of lobes within the eductor assembly inner shroud may vary depending on exhaust duct diameter and cooling air flow requirements. Similarly, the geometrical shape of the mixing lobes 87 may vary based on pumping requirements and acoustics. These mixing lobes 87 can be either welded or mechanically fastened to the cooling air plenum inner shroud 86.

The eductor assembly incorporates a primary surge bleed plenum 88 in which the surge bleed flow is redistributed circumferentially before exiting through a series of openings on the surge bleed flow plenum inner shroud 89 and entering the secondary surge bleed plenum 90. In this plenum, the surge bleed flow is realigned axially and then ejected back into the main engine gas path through the surge bleed nozzle 85. The primary surge bleed plenum 88 is fed, during specific engine operating conditions, by the surge bleed duct 48. This surge bleed flow is controlled by the modulating surge bleed valve 50 located in the surge bleed duct 48. Flow from the surge bleed duct 48 enters the primary surge bleed plenum 88, at the junction 93 of the two components, in a radial direction and impinges directly on the diaphragm 94, which divides the primary surge bleed plenum 86 and the cooling air plenum 95. This diaphragm 94 has a conical shape and acts as a natural splitter to redistribute the surge bleed flow uniformly around the circumference of the surge bleed plenum inner shroud 89.

The cooling air plenum 95 located on the aft side of the diaphragm 94 is bounded by the cooling air plenum outer shroud 96 and inner shroud 86. Openings 97 are provided on the outer shroud for the cooling air to enter the cooling air plenum 95. The air cooled heat exchanger 14 is located upstream of these openings. Both the surge bleed flow and the cooling air flow plenums 88 and 95 respectively are sealed to prevent any leakage.

Figure 7:
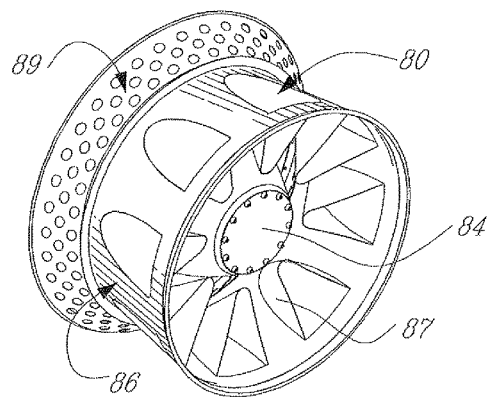
FIG. 7 is a perspective view of the cooling air flow inner shroud of the exhaust eductor assembly shown in FIG. 6.
Figure 8:
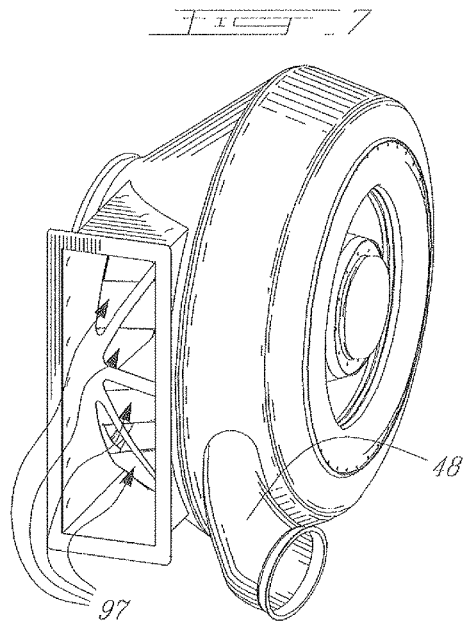
FIG. 8 is a side perspective view of the exhaust eductor assembly shown in FIG. 6.

A mechanical interface 98 is provided on the downstream end of the eductor assembly for connecting to the aircraft exhaust duct 40. Opening 56 is provided on the cooling air plenum outer shroud in order to accept ventilation air exiting from the engine compartment. The cutouts 80 on the cooling air flow inner shroud 86, as seen in FIG. 7, are provided in line with each mixing lobe 87.

The layout of the eductor assembly as described in detail above offers several additional advantages. The engine exhaust velocity can be easily altered by changing a simple axisymmetric part, namely, the primary nozzle shroud 83, in order to improve the amount of secondary air flow used for cooling purposes. This can be easily done without requiring modification of any of the more complex and more expensive parts of the eductor assembly. Also, a large exhaust plug 84 is required in order to control the air flow in the primary nozzle 82 and the air flow into the primary passages of the mixing lobes 87. The resulting large volume of space inside the exhaust plug 84 can then be used for acoustic treatment, for example, by introducing inside the plug low frequency cavities extending from the engine exhaust casing 81 interface to the cooling air flow mixing plane.

Therefore, in summary, the eductor assembly and passive cooling system of the present invention, provides engine oil cooling and engine enclosure cooling without requiring the use of any rotating parts and permits the reinjection of surge bleed flow into the main engine exhaust gas path thereby providing additional pumping capability to the cooling air. The eductor assembly is additionally capable of redistributing the surge bleed flow circumferentially within the surge bleed plenum, providing a method for controlling the pumping capability of the eductor assembly by the introduction of a simple axisymmetric primary nozzle shroud into the main exhaust gas path, and providing a method to control the noise generated by the engine in the eductor assembly by the introduction of a large exhaust plug with internal acoustic chambers.

The embodiments of the invention described above are intended to be exemplary only. The scope of the invention is therefore intended to be limited solely by the scope of the appended claims.

What is claimed is:

1. A method of improving air flow through an educted heat exchanger, the method comprising the steps of:
   providing a gas turbine exhaust flow;
   flowing the exhaust flow through an exhaust eductor to entrain a heat exchange air flow through a heat exchanger, and then mixing the heat exchange air flow into the exhaust flow, the heat exchange air flow and the exhaust flow intersecting within the exhaust eductor and thereby mixing together; and
   injecting pressurized surge bleed air into one of the heat exchange air flow and the gas turbine exhaust flow, wherein said injection occurs upstream of the exhaust eductor within which said intersection of the heat exchange and exhaust flows occurs.

2. The method of claim 1 wherein said surge bleed air is injected into the gas turbine exhaust flow upstream of said intersection of the heat exchange and exhaust flows.

3. The method of claim 1 wherein said surge bleed air is injected selectively when the additional kinetic energy of the surge bleed air is required to enhance air flow through the heat exchanger.

4. The method of claim 2 wherein said surge bleed air is injected selectively when the additional kinetic energy of the surge bleed air is desired to increase the heat exchange air flowing through the heat exchanger.

5. The method of claim 1 wherein the injection of the surge bleed flow is modulated by a surge bleed valve.

6. The method of claim 2 wherein the turbine exhaust flow is directed through the exhaust eductor using a primary nozzle and wherein the surge bleed air is injected into the exhaust flow by a surge bleed nozzle upstream of where the heat exchange and exhaust flows intersect, the surge bleed nozzle circumscribing the primary nozzle.

7. A method of improving air flow through an educted heat exchanger, the method comprising the steps of:
   providing a gas turbine exhaust flow through an exhaust eductor assembly, the exhaust eductor assembly including a primary nozzle and a mixer;
   using the exhaust flow through the primary nozzle to entrain a heat exchange air flow through a heat exchanger and into the mixer, the mixer mixing the heat exchange air flow and the exhaust flow mixing together; and
   using a surge bleed nozzle to inject pressurized surge bleed air into one of the heat exchange air flow and the gas turbine exhaust flow at a position upstream of said initial mixing of the heat exchange airflow and the exhaust flow.

8. The method of claim 7, wherein the injecting the surge bleed air is into the gas turbine exhaust flow circumferentially around the exhaust flow.

9. The method of claim 7, wherein the injecting the surge bleed air is into the gas turbine exhaust flow within the primary nozzle.

10. The method of claim 7, wherein the surge bleed nozzle is disposed within the exhaust eductor assembly and at least partially circumscribes the primary nozzle, further comprising using the surge bleed nozzle to introduce the surge bleed air directly into the primary nozzle at said position upstream of where the heat exchange airflow and the exhaust flow mix together.

11. The method of claim 7, wherein the pressurized surge bleed air is injected into the heat exchange air flow at said position upstream of said mixing of the heat exchange air flow and the exhaust flow.

12. The method of claim 7, wherein the pressurized surge bleed air is injected into the exhaust flow at said position upstream of said mixing of the heat exchange air flow and the exhaust flow.

13. The method of claim 7, wherein the injecting occurs where a surge bleed duct joins an exhaust ejector which, in turn, is received in the exhaust eductor.

14. The method of claim 7, wherein the injecting occurs where a bleed duct joins a heat exchanger discharge duct upstream of the eductor.

15. The method of claim 1, wherein said surge bleed air is injected into the heat exchange air flow upstream of said intersection of the heat exchange air flow and exhaust flow.

16. The method of claim 1, wherein the injecting occurs where a surge bleed duct joins an exhaust ejector which, in turn, is received in the exhaust eductor.

17. The method of claim 1, wherein the injecting occurs where a bleed duct joins a heat exchanger discharge duct upstream of the eductor.

18. A method of improving airflow through an educted heat exchanger, the method comprising the steps of:

providing a gas turbine exhaust flow;

using the exhaust flow to entrain a heat exchange air flow through a heat exchanger and into the exhaust flow, the heat exchanger airflow and the exhaust flow mixing together at a mixing plane; and injecting pressurized surge bleed air into the gas turbine exhaust flow, wherein said injection occurs upstream of the mixing plane.

19. The method of claim 18 wherein surge bleed air is injected selectively when the additional kinetic energy of the surge bleed air is required to enhance air flow through the heat exchanger.

20. The method of claim 18 wherein surge bleed air is injected selectively when the additional kinetic energy of the surge bleed air is desired to increase the heat exchange air flowing through the heat exchanger.

21. The method of claim 18 wherein the surge bleed air injection increases the heat exchange airflow.

22. The method of claim 1 wherein:

the injecting pressurized surge bleed air is upstream of an initial said mixing together of the heat exchange flow and exhaust flow.

23. A method of improving airflow through an educted heat exchanger, the method comprising the steps of:

providing a gas turbine exhaust flow;

using the exhaust flow to entrain a heat exchange air flow through a heat exchanger and into the exhaust flow, the heat exchanger airflow and the exhaust flow mixing together at a mixing plane downstream of an exhaust ejector; and injecting pressurized surge bleed air into the gas turbine exhaust flow, wherein said injection occurs upstream of the exhaust ejector.

* * * * *